US010070050B2

(12) United States Patent
De Bayser et al.

(10) Patent No.: US 10,070,050 B2
(45) Date of Patent: Sep. 4, 2018

(54) DEVICE, SYSTEM AND METHOD FOR COGNITIVE IMAGE CAPTURE

(71) Applicant: INTERNATIONAL BUSINESS MACHINES CORPORATION, Armonk, NY (US)

(72) Inventors: Maira Gatti De Bayser, Rio de Janeiro (BR); Maximilien Philippe Marie Arnaud De Bayser, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/334,908

(22) Filed: Oct. 26, 2016

(65) Prior Publication Data
US 2017/0339340 A1 Nov. 23, 2017

Related U.S. Application Data

(63) Continuation of application No. 15/160,063, filed on May 20, 2016, now Pat. No. 9,918,006.

(51) Int. Cl.
H04N 5/232 (2006.01)
G06F 17/30 (2006.01)
(Continued)

(52) U.S. Cl.
CPC ......... H04N 5/23222 (2013.01); G06F 3/167 (2013.01); G06F 17/277 (2013.01);
(Continued)

(58) Field of Classification Search
CPC .. G06K 9/00221; G06K 9/46; H04N 5/23293; H04N 5/23222; G06F 17/30265;
(Continued)

(56) References Cited

U.S. PATENT DOCUMENTS

2004/0008258 A1* 1/2004 Aas ................... G06K 9/00288
348/207.1
2007/0288499 A1 12/2007 Dunko
(Continued)

FOREIGN PATENT DOCUMENTS

CN 203313287 11/2013

OTHER PUBLICATIONS

Desnoyer, Mark, and David Wettergreen. "Aesthetic image classification for autonomous agents." Pattern Recognition (ICPR), 2010 20th International Conference on. IEEE, 2010.
(Continued)

Primary Examiner — Ahmed A Berhan
(74) Attorney, Agent, or Firm — F. Chau & Associates, LLC

(57) ABSTRACT

An image capture device includes a camera lens capturing image data, a microphone receiving a voice command from a user, a network interface, a memory storing a computer program, and a processor configured to execute the computer program. The computer program is configured to identify a target subject and an image capture function based on the voice command and user preference data. The computer program is configured to search a first database for the target subject and search a second database for the target subject, extract a visual representation of the target subject, detect the target subject in an environment viewed through camera lens, and apply the image capture function to the target subject detected in the environment. It is determined if image data is captured by the user and the user preference data is updated based on whether the image data is captured or not.

20 Claims, 9 Drawing Sheets

(51) Int. Cl.

| | | |
|---|---|---|
| *G06F 17/20* | (2006.01) | |
| *G10L 15/22* | (2006.01) | |
| *G06K 9/00* | (2006.01) | |
| *G06K 9/46* | (2006.01) | |
| *G06F 3/16* | (2006.01) | |
| *G10L 15/18* | (2013.01) | |
| *G06F 17/27* | (2006.01) | |

(52) U.S. Cl.
CPC .. *G06F 17/30277* (2013.01); *G06F 17/30867* (2013.01); *G06K 9/00288* (2013.01); *G06K 9/46* (2013.01); *G10L 15/18* (2013.01); *G10L 15/22* (2013.01); *H04N 5/23216* (2013.01); *H04N 5/23219* (2013.01); *G10L 2015/223* (2013.01)

(58) Field of Classification Search
CPC ........... G06F 17/30401; G06F 17/3043; G06F 3/167; G10L 15/22; G10L 15/02; G10L 15/18

See application file for complete search history.

(56) References Cited

U.S. PATENT DOCUMENTS

| | | | |
|---|---|---|---|
| 2011/0058060 A1 | 3/2011 | Bigioi et al. | |
| 2013/0235254 A1 | 9/2013 | Fillbrandt et al. | |
| 2014/0009636 A1* | 1/2014 | Lee | H04N 5/23212 348/222.1 |
| 2014/0082501 A1* | 3/2014 | Bae | H04M 1/72569 715/728 |
| 2014/0201241 A1 | 7/2014 | Wood et al. | |
| 2014/0350924 A1 | 11/2014 | Zurek et al. | |
| 2015/0235064 A1 | 8/2015 | Johannesen et al. | |
| 2015/0261744 A1 | 9/2015 | Suenbuel et al. | |
| 2016/0182814 A1* | 6/2016 | Schwesinger | H04N 7/147 348/14.03 |

OTHER PUBLICATIONS

Shi, Yu, Parnesh Raniga, and Ismail Mohamed. "A smart camera for multimodal human computer interaction." Consumer Electronics, 2006. ISCE'06. 2006 IEEE Tenth International Symposium on. IEEE, 2006.

Chattopadhyay, Rita. "Smart camera design and applications." IET Conference Proceedings (2006): 451-453.

Shen, Edward, and Richard Hornsey. "Camera selection using a local image quality metric for a distributed smart camera network." Sensors, 2011 IEEE. IEEE, 2011.

Wittke, Michael, et al. "MIDSCA: Towards a Smart Camera architecture of mobile internet devices." Distributed Smart Cameras, 2008. ICDSC 2008. Second ACM/IEEE International Conference on. IEEE, 2008.

Bistry, Hannes, and Jianwei Zhang. "Task oriented control of smart camera systems in the context of mobile service robots." Intelligent Robots and Systems, 2009. IROS 2009. IEEE/RSJ International Conference on. IEEE, 2009.

Luo, Ren C., Wai Un Chan, and Po-Jen Lai. "Intelligent robot photographer: Help people taking pictures using their own camera." System Integration (SII), 2014 IEEE/SICE International Symposium on. IEEE, 2014.

Ahn, Hyunsang, et al. "A robot photographer with user interactivity." Intelligent Robots and Systems, 2006 IEEE/RSJ International Conference on. IEEE, 2006.

Byers, Zachary, et al. "An autonomous robot photographer." Intelligent Robots and Systems, 2003.(IROS 2003). Proceedings. 2003 IEEE/RSJ International Conference on. vol. 3. IEEE, 2003.

Li, Tsai-Yen, and Xiang-Yan Xiao. "An interactive camera planning system for automatic cinematographer." Multimedia Modelling Conference, 2005. MMM 2005. Proceedings of the 11th International. IEEE, 2005.

Vazquez, Marynel, and Aaron Steinfeld. "An assisted photography method for street scenes." Applications of Computer Vision (WACV), 2011 IEEE Workshop on. IEEE, 2011.

Digital Camera World, "Best camera focus techniques: 10 surefire ways to get sharp photos" Techradar, published Jan. 14, 2016 [online at the internet:<URL: http://www.digitalcameraworld.com/2016/01/14/best-camera-focus-techniques-10-surefire-ways-to-get-sharp-photos-2/]. [Last Visited May 17, 2016].

Digital Camera World, "10 rules of photo composition (and why they work)" Techradar, published Apr. 12, 2012 [online at the internet:<URL: http://www.digitalcameraworld.com/2012/04/12/10-rules-of-photo-composition-and-why-they-work/]. [Last Visited May 17, 2016].

U.S. Appl. No. 15/160,063, filed May 20, 2016.

Office Action dated Aug. 17, 2017 issued in co-pending U.S. Appl. No. 15/160,063.

Office Action dated Oct. 10, 2017 issued in co-pending U.S. Appl. No. 15/334,836.

* cited by examiner

DEVICE, SYSTEM AND METHOD FOR COGNITIVE IMAGE CAPTURE

CROSS-REFERENCE TO RELATED APPLICATION

This application is a continuation of U.S. application Ser. No. 15/160,063, filed on May 20, 2016, the disclosure of which is incorporated by reference herein in its entirety.

BACKGROUND

Exemplary embodiments of the present invention relate to a device, system and method for adaptive image capture.

Professional grade cameras with the capacity to capture high quality images are being sold at an increasing rate. Digital cameras, for example, have become relatively easy to use, but also include an array of professional grade adjustable settings. A digital camera may allow a novice camera user to take high quality pictures by using automated features of the digital camera without substantial knowledge of how to adjust camera parameters such as shutter speed, ISO settings and aperture size. While high quality images may be captured by a novice user with limited understanding of the camera's settings, digital cameras also include an array of settings which may be manually adjusted to further increase picture quality or to modify stylistic characteristics of an image being captured.

Digital cameras may be manually adjusted to focus on a particular object in a landscape. Camera settings such as shutter speed, ISO setting and aperture size may be manually adjusted to improve image quality or to achieve desired artistic or stylistic characteristics in a captured image. However, novice camera users may lack knowledge or interest in learning how to adjust such manual settings, and therefore many manual adjustment settings and features included with a camera may go unused.

Thus, it may be desirable to have an image capture device (e.g., digital camera), and a system and method for dynamic image capture with a user friendly interface for adjusting the settings of the image capture device.

SUMMARY

Exemplary embodiments of the present invention provide an image capture device including a camera lens configured to capture image data, a microphone configured to receive a voice command from a user, a network interface configured to establish a network connection, a memory storing a computer program and user preference data, and a processor configured to execute the computer program. The computer program is configured to identify a target subject and an image capture function based on the voice command and the user preference data. The computer program is configured to search a first database for the target subject, wherein the first database is stored on the memory. The computer program is configured to search a second database for the target subject when the target subject is not found in the first database, wherein the second database is located remote from the image capture device and is accessed via the network connection, such as an Internet connection. The computer program is configured to extract a visual representation of the target subject from the first database or the second database upon finding the target subject in the first database or the second database. The computer program is configured to detect the target subject in an environment viewed through camera lens by comparing the visual representation of the target subject with objects appearing in the environment. The computer program is configured to apply the image capture function to the target subject detected in the environment. The computer program is configured to determine if image data is captured by the user. The computer program is configured to update the user preference data based on whether the image data is captured or not.

According to an exemplary embodiment of the present invention the target subject may be an object, person or animal. The object, person or animal may be identified in the voice command from the user using natural language processing (NLP).

According to an exemplary embodiment of the present invention the image capture device may include an input interface such as, for example, touchscreen interface or a biometry interface (e.g., a fingerprint reader) configured to receive input from the user. The computer program may be configured to log in to a social media network using credentials provided by the user through the touchscreen interface or any other means of providing credentials, like biometry. The second database may be a collection of Internet-based data bases like the social media network or public databases and databases present on nearby devices like the users smartphone.

According to an exemplary embodiment of the present invention searching the second database for the target subject may include searching a contact list of the social media network for the person's or animal's name to identify the visual representation of the target subject.

According to an exemplary embodiment of the present invention searching the second database for the target subject may include identifying faces from among the objects appearing in the environment, and comparing the identified faces from the environment with faces in a contact list of the social media network to identify the visual representation of the target subject.

According to an exemplary embodiment of the present invention the target subject may be one of the objects appearing in the environment.

According to an exemplary embodiment of the present invention the second database may be a public image database accessible via the network connection.

According to an exemplary embodiment of the present invention searching the second database for the target subject may include searching the public image database using a name of the target subject to identify the visual representation of the target subject. The name of the target subject may be included in the voice command.

According to an exemplary embodiment of the present invention searching the second database for the target subject may include comparing the objects appearing in the environment with objects stored in the public image database to identify the visual representation of the target subject.

Exemplary embodiments of the present invention provide a computer-implemented method of learning image capture device user preferences including receiving a voice command from a user. The voice command is received by a microphone of an image capture device. A target subject and an image capture function is identified based on the voice command and user preference data. A first database is searched for the target subject. The first database is stored on a memory disposed in the image capture device. A second database is searched for the target subject when the target subject is not found in the first database. The second database is located remote from the image capture device and is accessed via a network connection established using a network interface of the image capture device. A visual representation of the target subject is extracted from the first database or the second database upon finding the target subject in the first database or the second database. The target subject is detected in an environment viewed through a camera lens of the image capture device by comparing the visual representation of the target subject with objects appearing in the environment. The image capture function is applied to the target subject detected in the environment. It is determined if image data is captured by the user. The user preference data is updated based on whether image data is captured.

According to an exemplary embodiment of the present invention the target subject may be an object, person or animal. The object, person or animal may be identified in the voice command from the user using natural language processing (NLP).

According to an exemplary embodiment of the present invention the method of capturing image data may include logging in to a social media network, by the user, via a user interface of the image capture device. The second database may be the social media network.

According to an exemplary embodiment of the present invention searching the second database for the target subject may include searching a contact list of the social media network for the person's or animal's name to identify the visual representation of the target subject.

According to an exemplary embodiment of the present invention searching the second database for the target subject may include identifying faces from among the objects appearing in the environment, and comparing the identified faces from the environment with faces in a contact list of the social media network to identify the visual representation of the target subject.

According to an exemplary embodiment of the present invention the target subject may be one of the objects appearing in the environment.

According to an exemplary embodiment of the present invention the second database may be a public image database accessible via the network connection.

According to an exemplary embodiment of the present invention searching the second database for the target subject may include searching the public image database using a name of the target subject to identify the visual representation of the target subject. The name of the target subject may be included in the voice command.

According to an exemplary embodiment of the present invention searching the second database for the target subject may include comparing the objects appearing in the environment with objects stored in the public image database to identify the visual representation of the target subject.

According to an exemplary embodiment of the present invention the image capture function may include one of a sharpness modification function, a brightness modification function, a focus modification function, a motion blur modification function, a temperature modification function, and a contract modification function.

Exemplary embodiments of the present invention provide a computer program product for learning image capture device user preferences, the computer program product including a computer readable storage medium having program instructions embodied therewith. The program instructions are executable by a processor to cause the processor to perform the following. Receive a voice command from a user. The voice command is received by a microphone of an image capture device. Identify a target subject and an image capture function based on the voice command and user preference data. Search a first database for the target subject. The first database is stored on a memory disposed in the image capture device. Search a second database for the target subject when the target subject is not found in the first database. The second database is located remote from the image capture device and is accessed via a network connection established using a network interface of the image capture device. Extract a visual representation of the target subject from the first database or the second database upon finding the target subject in the first database or the second database. Detect the target subject in an environment viewed through a camera lens of the image capture device by comparing the visual representation of the target subject with objects appearing in the environment. Apply the image capture function to the target subject detected in the environment. Determine if image capture data is captured by the user and update the user preference data based on whether image data is captured.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1:
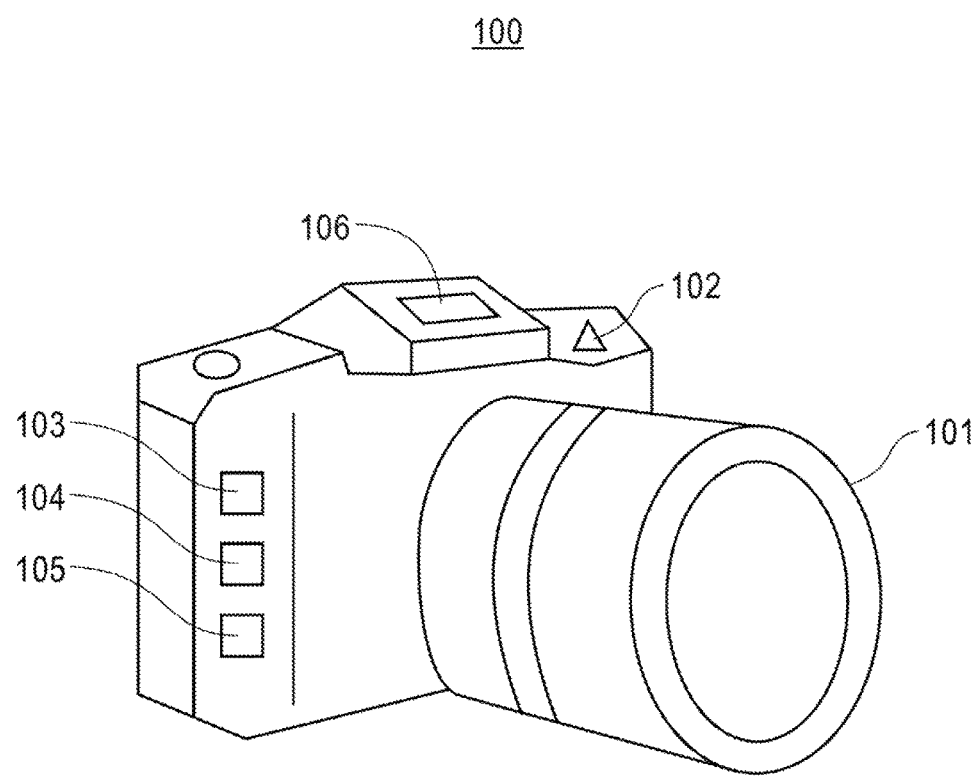
FIG. 1 illustrates an image capture device according to an exemplary embodiment of the present invention.

Although nearly all modern digital cameras can focus the lens automatically they also allow you to focus manually instead. Manual focus is a particularly good option with macro photography because many cameras struggle to lock onto very close subjects and the lens ends up hunting (moving in and out of focus) every time the shutter release button is depressed. It may be far less frustrating to switch the camera (or the lens) to manual focus and do the job yourself. For example, accessing the manual settings of a camera may allow the user to focus on a desired person or object which is not substantially centered in the camera's viewfinder, or which is not easily focused on by the autofocus settings of the camera. However, many camera users may lack the knowledge or confidence to access and adjust the camera's manual settings.

Exemplary embodiments of the present invention provide a device, system and method for an adaptive personalized social smart camera. A user of the camera, system and method according to exemplary embodiments of the present invention may interact with the camera through natural language commands, and/or by giving specific commands or high-level goals. For example, a user may provide a natural language command or a high-level goal by referencing entities in the scene. The camera may then react by changing the camera's settings, identifying and tagging people, objects or places in the screen by name or image using online social networks or online search engines, or by automatically tuning the camera, given the learned features acquired during its usage. The camera may also give the user hints to improve image composition.

Exemplary embodiments of the present invention will be described more fully hereinafter with reference to the accompanying drawings. Like reference numerals may refer to like elements throughout the specification and drawings.

FIG. 1 illustrates an image capture device according to an exemplary embodiment of the present invention.

Referring to FIG. 1, exemplary embodiments of the present invention provide an image capture device 100 (e.g., a camera such as a digital camera) including a camera lens 101 configured to capture image data, a microphone 102 configured to receive a voice command from a user, a network interface 103 configured to establish a network/Internet connection, a memory 104 storing a computer program, and a processor 105 configured to execute the computer program. The computer program is configured to identify a target subject and an image capture function included in the voice command using natural language processing (NLP). The computer program is configured to search a first database for the target subject, wherein the first database is stored on the memory. The computer program is configured to search a second database for the target subject when the target subject is not found in the first database, wherein the second database is located remote from the image capture device and is accessed via the network/Internet connection. The computer program is configured to extract a visual representation of the target subject from the first database or the second database upon finding the target subject in the first database or the second database. The computer program is configured to detect the target subject in an environment viewed through camera lens by comparing the visual representation of the target subject with objects appearing in the environment. The computer program is configured to apply the image capture function to the target subject detected in the environment. The computer program is configured to capture the image data. The image data includes the target subject, and the image capture function has been applied to the target subject in the captured image data.

The image capture device 100 according to exemplary embodiments of the present invention may be any electronic device that can capture images, such as digital images. For example, the image capture device 100 may be a standalone camera (e.g., a digital camera), a tablet, a smartphone, or a tablet computer. However, exemplary embodiments of the present invention are not limited thereto, and the image capture device 100 may be any desired device for capturing images or pictures. That is, even when a "camera" is referred to, it will be understood that the term camera is not intended to be limiting, and a camera may be replaced with a standalone camera (e.g., a digital camera), a tablet, a smart-phone, or a tablet computer, for example. Thus, the terms camera, and terms (e.g., smartphone) referring to other image capture devices may be used interchangeably herein.

The image capture device 100 according to an exemplary embodiment of the present invention may include a user interface 106. The user interface 106 may include one or more interface screens, such as a touch screen for receiving input from the user and/or displaying image capture device information to the user. The user may interact with the user interface 106 to modify the camera settings or to respond to a prompt by the image capture device. For example, the image capture device 100 may pose a query to the user regarding why an image was not captured, and the user's response may be used by a self-learning image capture device when capturing images in the future, as discussed below in more detail.

The network interface 103 according to exemplary embodiments of the present invention may transmit and/or receive a WiFi, cellular or any desired wireless signal, however, exemplary embodiments of the present invention are not limited thereto, and the network interface 103 may include any desired network interface which may be configured to establish an Internet connection.

According to an exemplary embodiment of the present invention the target subject may be a person or animal in the environment. The person may be identified in the voice command by the person's or animal's name.

According to an exemplary embodiment of the present invention the image capture device may include an input interface such as, for example, a touchscreen interface or a biometric interface (e.g., a fingerprint reader) configured to receive input from the user. The computer program may be configured to log in to a social media network using credentials provided by the user through the touchscreen interface. The second database may be the social media network.

According to an exemplary embodiment of the present invention searching the second database for the target subject may include searching a contact list of the social media network for the person's or animal's name to identify the visual representation of the target subject.

According to an exemplary embodiment of the present invention searching the second database for the target subject may include identifying faces from among the objects appearing in the environment, and comparing the identified faces from the environment with faces in a contact list of the social media network to identify the visual representation of the target subject.

According to an exemplary embodiment of the present invention the target subject may be one of the objects appearing in the environment.

According to an exemplary embodiment of the present invention the second database may be a public image database accessible via the network/Internet connection.

According to an exemplary embodiment of the present invention searching the second database for the target subject may include searching the public image database using a name of the target subject to identify the visual representation of the target subject. The name of the target subject may be included in the voice command.

According to an exemplary embodiment of the present invention searching the second database for the target subject may include comparing the objects appearing in the environment with objects stored in the public image database to identify the visual representation of the target subject.

Figure 2:
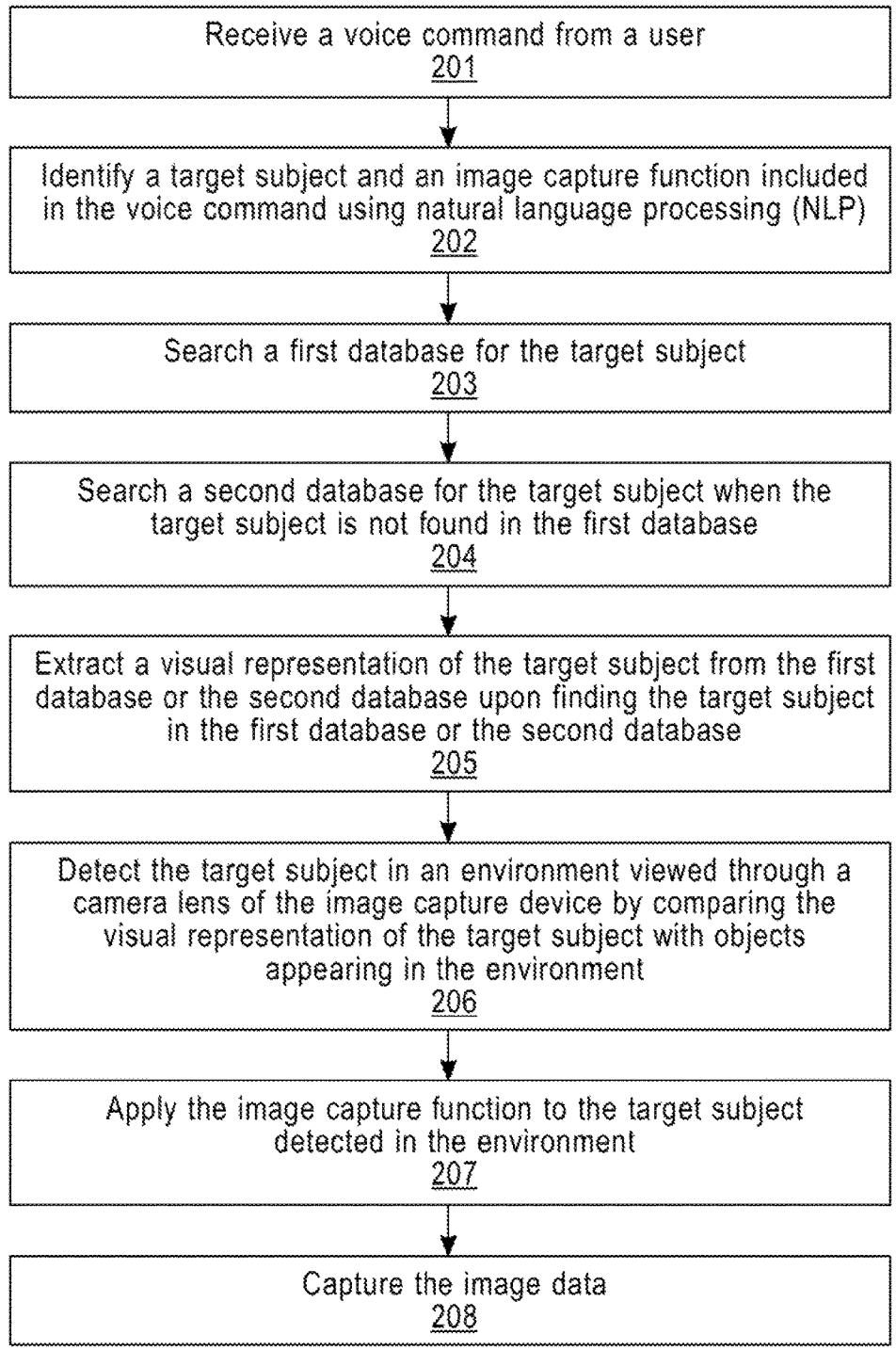
FIG. 2 is a flowchart illustrating a method of capturing image data according to an exemplary embodiment of the present invention.

FIG. 2 is a flowchart illustrating a method of capturing image data according to an exemplary embodiment of the present invention.

Referring to FIG. 2, a method of capturing image data includes receiving a voice command from a user at operation 201. The voice command is received by a microphone (e.g., the microphone 102) of an image capture device (e.g., image capture device 100). A target subject and an image capture function included in the voice command is identified using natural language processing (NLP) at operation 202. A first database is searched for the target subject at operation 203. The first database is stored on a memory disposed in the image capture device. A second database is searched for the target subject when the target subject is not found in the first database at operation 204. The second database is located remote from the image capture device and is accessed via a network/Internet connection established using a network interface of the image capture device. A visual representation of the target subject is extracted from the first database or the second database upon finding the target subject in the first database or the second database at operation 205. The target subject is detected in an environment viewed through a camera lens of the image capture device by comparing the visual representation of the target subject with objects appearing in the environment at operation 206. The image capture function is applied to the target subject detected in the environment at operation 207. The image data is captured at operation 208. The image data includes the target subject, and the image capture function has been applied to the target subject in the captured image data.

A target subject according to exemplary embodiments of the present invention may refer to, for example, a person, an animal, an object, a place, or any desired combination of a person(s), object(s) and/or place(s), as desired.

An image capture function according to an exemplary embodiment of the present invention may refer to a specific task or command (e.g., a natural language command spoken by the user of the image capture device) for the image capture device included in the user's voice command. For example, an image capture function may include a command to "please focus on Maria," "please focus on the boat," "please increase the contrast between the boat and water" and "please focus on the tree and leave the background de-focused."

According to an exemplary embodiment of the present invention the target subject may be a person or animal in the environment. The person or animal may be identified in the voice command by the person's or animal's name.

According to an exemplary embodiment of the present invention the method of capturing image data may include logging in to a social media network, by the user, via a user interface (e.g., user interface 106) of the image capture device. The second database may be the social media network. The user interface may include one or more interface screens, such as a touch screen for receiving input from the user and/or displaying image capture device information to the user. The user may interact with the user interface to modify the camera settings or to respond to a prompt by the image capture device. For example, the image capture device may pose a query to the user regarding why an image was not captured, which may be used by a self-learning image capture device, as discussed below in more detail.

According to an exemplary embodiment of the present invention searching the second database for the target subject may include searching a contact list of the social media network for the person's or animal's name to identify the visual representation of the target subject.

According to an exemplary embodiment of the present invention searching the second database for the target subject may include identifying faces from among the objects appearing in the environment, and comparing the identified faces from the environment with faces in a contact list of the social media network to identify the visual representation of the target subject. Database searching is described in more detail below, for example, with reference to FIGS. 4 and 8.

According to an exemplary embodiment of the present invention the target subject may be one of the objects appearing in the environment.

According to an exemplary embodiment of the present invention the second database may be a public image database (e.g. Google® images or Yahoo® images) accessible via the Internet connection.

According to an exemplary embodiment of the present invention searching the second database for the target subject may include searching the public image database using a name of the target subject to identify the visual representation of the target subject. The name of the target subject may be included in the voice command.

According to an exemplary embodiment of the present invention searching the second database for the target subject may include comparing the objects appearing in the environment with objects stored in the public image database to identify the visual representation of the target subject. Database searching is described in more detail below, for example, with reference to FIGS. 4 and 8.

According to an exemplary embodiment of the present invention the image capture function may include one of a sharpness modification function, a brightness modification function, a focus modification function, a motion blur modification function, a temperature modification function, a contrast modification function, or any other camera related function typically provided by a camera. However, the image capture function is not limited thereto.

Figure 3:
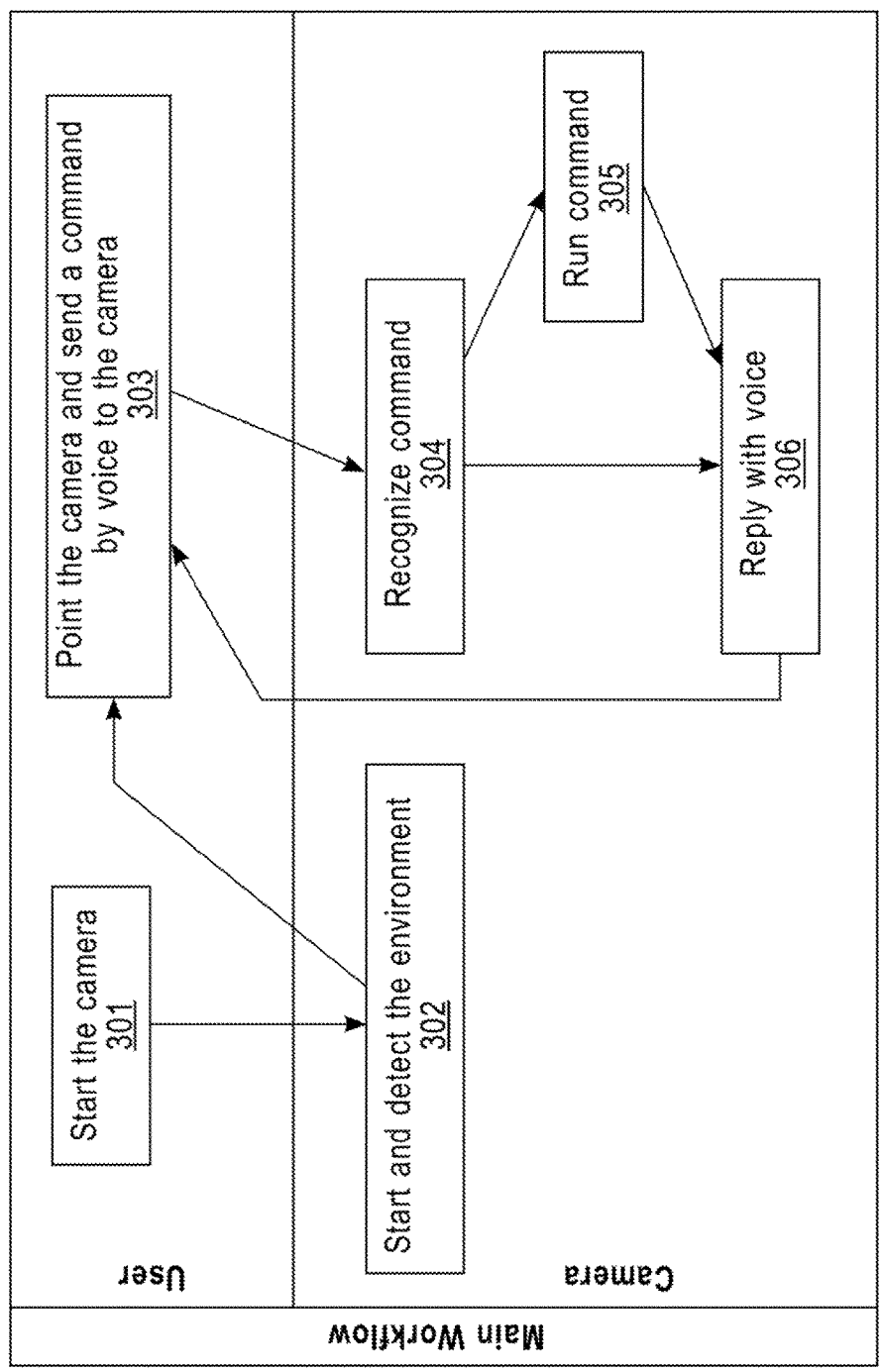
FIG. 3 is a flowchart illustrating a method of capturing image data using a voice command according to an exemplary embodiment of the present invention.

FIG. 3 is a flowchart illustrating a method of capturing image data using a voice command according to an exemplary embodiment of the present invention.

Referring to FIG. 3, a method of capturing image data using a voice command may include a user starting a camera at operation 301 (e.g., image capture device 100, which may be a digital camera), and the camera starting and detecting the environment at operation 302. The user may point the camera and send a command by voice to the camera at operation 303. The camera may recognize the command at operation 304 and reply with a voice at operation 306 back to the user, which may prompt the user to point the camera differently and/or respond with a second voice command. When the camera recognizes a command, the camera may run the command at operation 305 and may then respond back to the user with the voice reply at operation 306. A more detailed description of camera self learning, and processes employed by a camera to adaptively recognize and respond to a voice command are described below in more detail with reference to FIG. 8.

Figure 4:
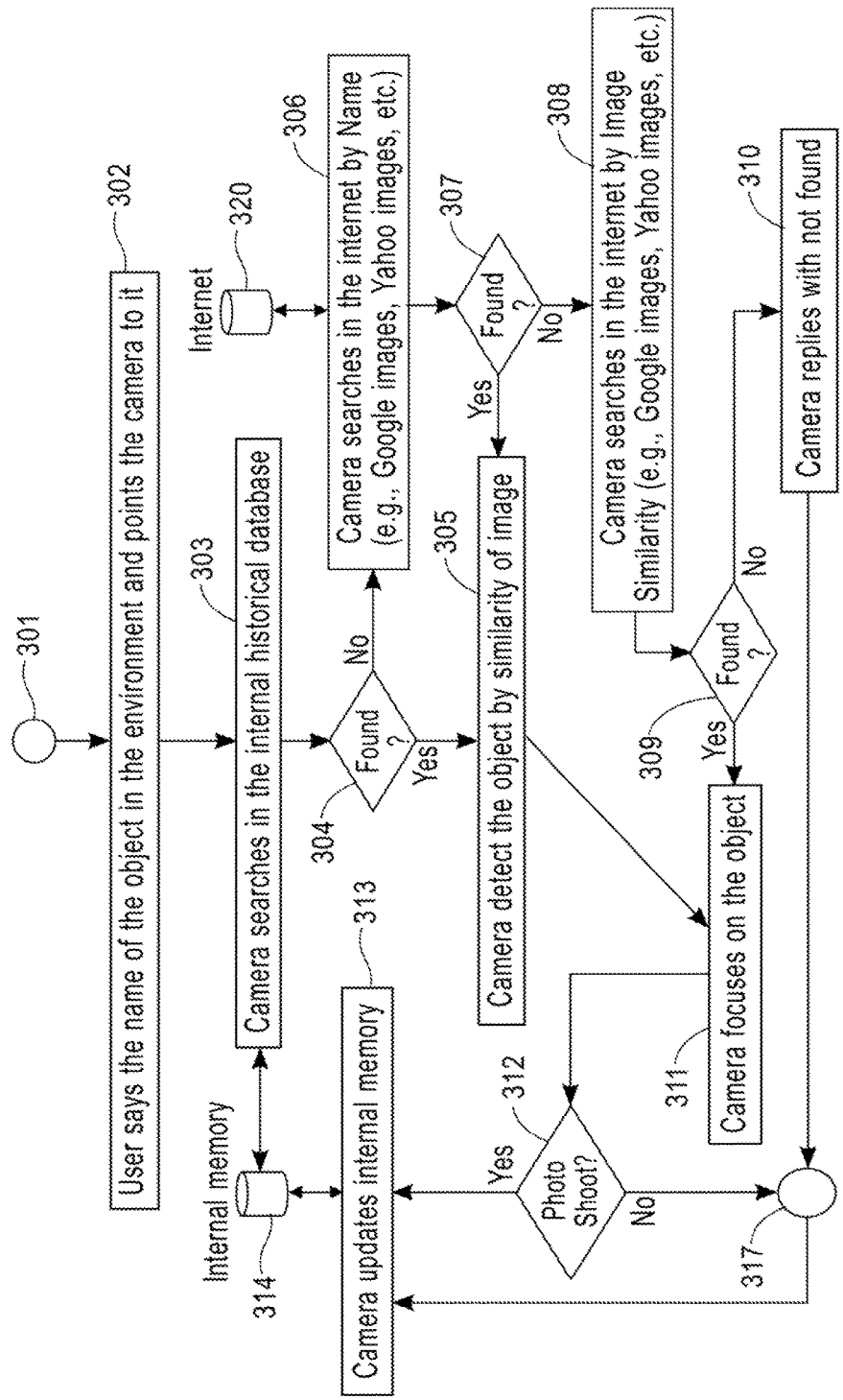
FIG. 4 is a flowchart illustrating a system and method for capturing image data using a voice command according to an exemplary embodiment of the present invention.

FIG. 4 is a flowchart illustrating a system and method for capturing image data using a voice command according to an exemplary embodiment of the present invention.

Referring to FIG. 4, a system and method for capturing image data using a voice command according to an exemplary embodiment of the present invention may include a start operation 301 when the user says the name of the object (the object may be a person, for example) in the environment and points the camera to it at operation 302. The camera (e.g., image capture device 100, which may be a digital camera) may search in the camera's internal historical database at operation 303, which may be stored in an internal memory 314 of the camera. The camera may determine if the object is found at operation 304. If the object is found (e.g., in the camera's internal memory 314) the camera may detect the object by similarity of image at operation 305. If the object is not found (e.g., in the camera's internal memory 314) the camera may search the Internet 320 (e.g., Google® Images or Yahoo® Images) by name at operation 306.

When the object is found in operation 304 and the camera detects the object by similarity of image at operation 305, the camera may focus on the object at operation 311 and the camera may query the user (e.g., "photo shoot?") at operation 312 to determine whether the image as currently focused should be taken. If the camera receives a response to shoot the photo then the camera may update the camera's internal memory 314 at operation 313. If the camera receives a response to not shoot the photo then the image capture process may end at operation 317. However, the camera may also update its internal memory when an image is not taken at operation 313. A decision to shoot or not shoot a photo may be used for a camera self-leaning process (e.g., to better understand the user's preferences). A more detailed description of camera self-learning, and processes employed by a camera to adaptively recognize and respond to a voice command are described below in more detail with reference to FIGS. 4 and 8.

If the object is not found in operation 304 and the camera searches the Internet 320 by name at operation 306, then it will be determined whether the object is found by name on the Internet at operation 307.

If the object is found on the Internet by name in operation 307, then the camera may proceed from operation 305, as described above in more detail.

If the object is not found on the Internet by name in operation 307, then the camera may search the Internet by image similarity (e.g., using Google® Images or Yahoo® Images) at operation 308. It will then be determined whether the object is found by image similarity at operation 309. If it is determined at operation 309 that the object was not found by image similarity, then the camera may reply with a not found message to the user at operation 310, and the process may end at operation 317. The camera may update its internal memory 314 at operation 313 to indicate that the object was not found by name or image similarity on the Internet.

When searching the Internet by image similarity at operation 308, the camera may search the Internet using facial recognition or object recognition. When searching the Internet using name recognition at operation 306, the camera may perform a text based search for objects labeled (e.g., objects including metadata) with a desired name. For example, the camera may search one or more of the user's social network accounts to identify people or objects that explicitly include a same name (e.g., John Smith), such as in a labeled image, or may search for objects by object or facial recognition.

According to an exemplary embodiment of the present invention, searches on a user's social network may include searching within the user's friends in the user's network. A graph search algorithm may be employed in searching the user's network. If the search is specific to the user's friends, the search can be accomplished by visiting each friend's profile and gathering their information. This can be done using the social network API and the user's credentials (e.g., Facebook API) or with an HTTP crawler using, for instance, a PageRank algorithm in a case of a public social network like Twitter.

According to an exemplary embodiment of the present invention the method of capturing image data may include logging in to a social media network, by the user, via a user interface (e.g., user interface 106) of the image capture device and searching one or more databases of the social media network. The user interface may include one or more interface screens, such as a touch screen for receiving input from the user and/or displaying image capture device information to the user. The user may interact with the user interface to modify the camera settings or to respond to a prompt by the image capture device. For example, the image capture device may pose a query to the user regarding why an image was not captured, which may be used by a self-learning image capture device, as discussed below in more detail.

According to an exemplary embodiment of the present invention searching the database for the target subject may include searching a contact list of the social media network for the person's or animal's name to identify the visual representation of the target subject.

According to an exemplary embodiment of the present invention searching the database for the target subject may include identifying faces from among the objects appearing in the environment, and comparing the identified faces from the environment with faces in a contact list of the social media network to identify the visual representation of the target subject. Database searching is described in more detail below, for example, with reference to FIGS. 4 and 8.

Figure 5:
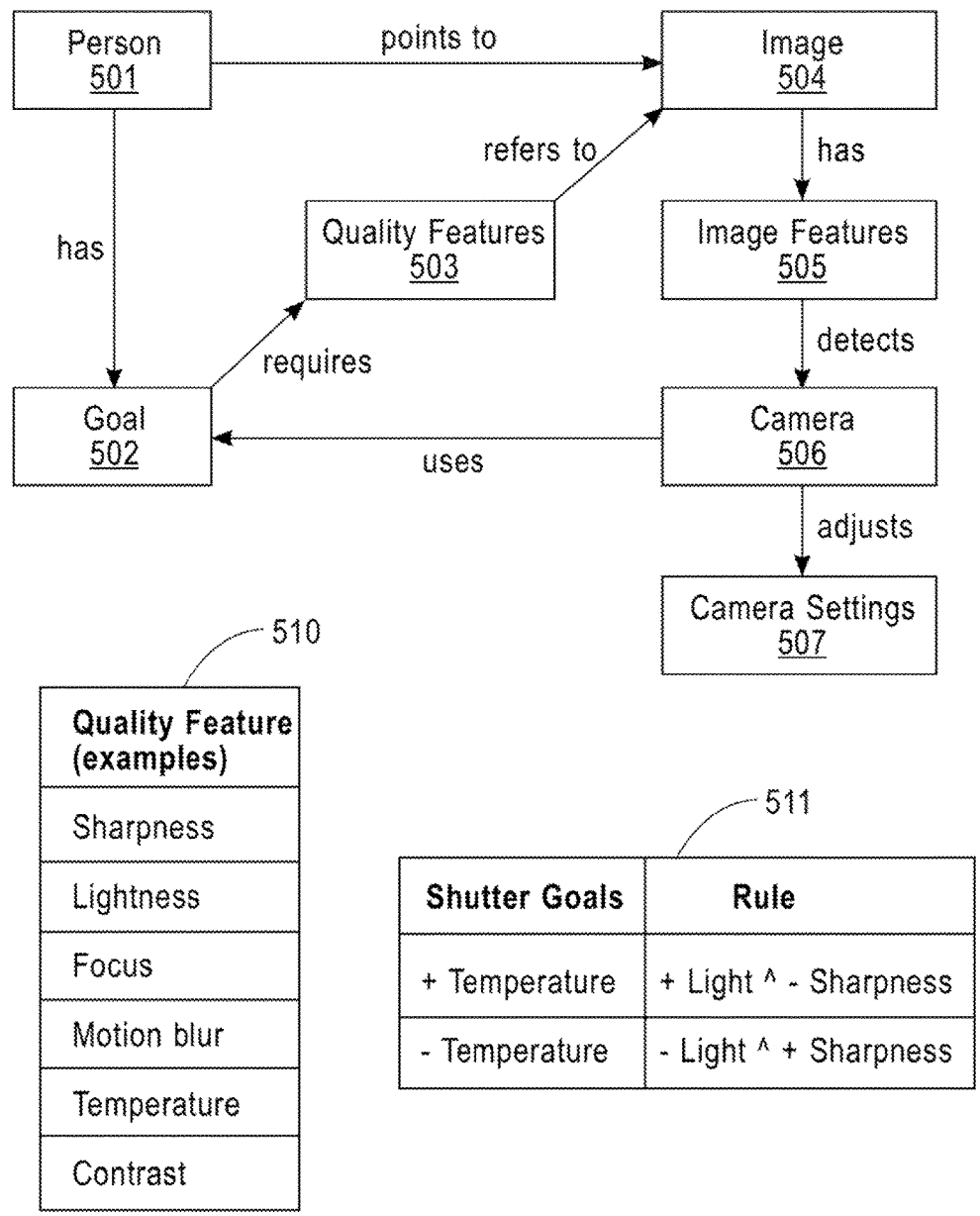
FIG. 5 is a flowchart illustrating a camera tuning advisor system and method according to an exemplary embodiment of the present invention.

FIG. 5 is a flowchart illustrating a camera tuning advisor system and method according to an exemplary embodiment of the present invention.

Referring to FIG. 5, a camera tuning advisor system and method according to an exemplary embodiment of the present invention may include a person 501 (e.g., a user) having a goal 502 having quality features 503 with regard to an image 504. The image 504 may include image features 505 which are detected by a camera 506 (e.g., image capture device 100, which may be a digital camera). The camera settings 507 may be adjusted to achieve the goal 502 indicated by the user.

The camera tuning advisor according to exemplary embodiments of the present invention may automatically adjust a camera's settings in response to a user's indicated goal (e.g., to capture an image focused on one person with a de-focused background), or may provide advice to the user on how to manually adjust the camera's settings to achieve the desired goal. The camera may communicate with the user through voice commands and/or through a user interface such as a display screen or a touchscreen (e.g., user interface 106).

A camera tuning advisor system and method according to an exemplary embodiment of the present invention may generate a quality feature table 510, which may include measurements of one or more of sharpness, lightness (e.g., brightness), focus, motion blur, temperature and contrast. Each goal may be associated with one or more changes to the applied camera settings. For example, a shutter speed of the camera may be adjusted to comply with one or more rules associated with temperature goals (see, e.g., table 511). Temperature goals may include a desired result including an increase in light and/or sharpness of an image which corresponds with a particular shutter speed. Thus, the camera tuning advisor may advise a user desiring a higher or lower temperature (e.g., higher or lower lightness and/or sharpness) of an image to increase or decrease the shutter speed because a stated temperature goal may be converted to a shutter speed goal.

According to an exemplary embodiment of the present invention, temperature may refer to a temperature of light, which may also be referred to as white balance. White balance may refer to a process of removing unrealistic color, so that objects which appear white in person are rendered white in a users photograph. White balance may take into account the color temperature of a light source, which may refer to the relative warmth or coolness of white light. For example, warmer colors may refer to red, yellow and orange colors in a color wheel, and cooler colors may refer to green, blue and purple colors in a color wheel.

Figure 6:
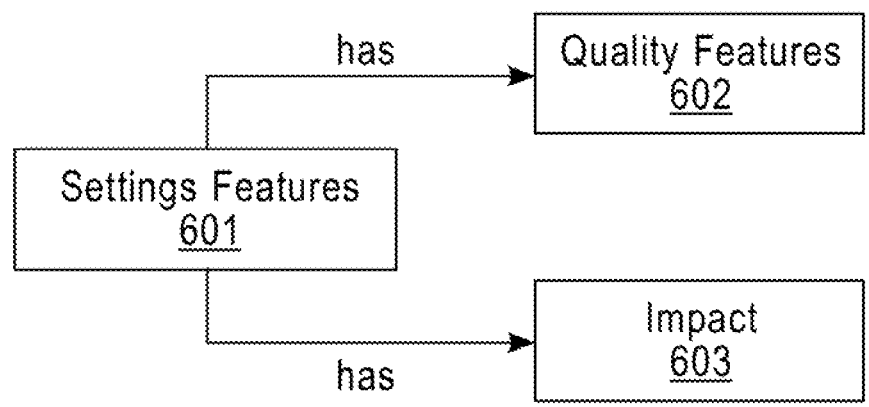
FIG. 6 illustrates a conceptual model of a camera according to an exemplary embodiment of the present invention.

FIG. 6 illustrates a conceptual model of camera according to an exemplary embodiment of the present invention.

Referring to FIG. 6, camera settings (e.g., camera settings 507) in a camera tuning advisor according to an exemplary embodiment of the present invention may include a settings feature 601 having quality features 602 and impact 603. For example, a particular settings feature 601 may correspond to a particular rule, as discussed above in more detail. Application of a particular rule may result in adjustment of one or more quality features 602 (e.g., sharpness, lightness, focus, motion blur, temperature and/or contrast) which may have a desired impact 603. For example, one setting feature for increasing temperature may increase a first quality feature (e.g., lightness) and decrease a second quality feature (e.g., sharpness), which may result in a higher temperature image being captured.

As discussed below in more detail, a plurality of setting features may be stored in a database (e.g., features database 804, described below in more detail). The features may be set by a manufacturer of a particular camera or by the camera's user and may be used and/or adjusted through camera self-learning, as discussed below in more detail.

Figure 7:
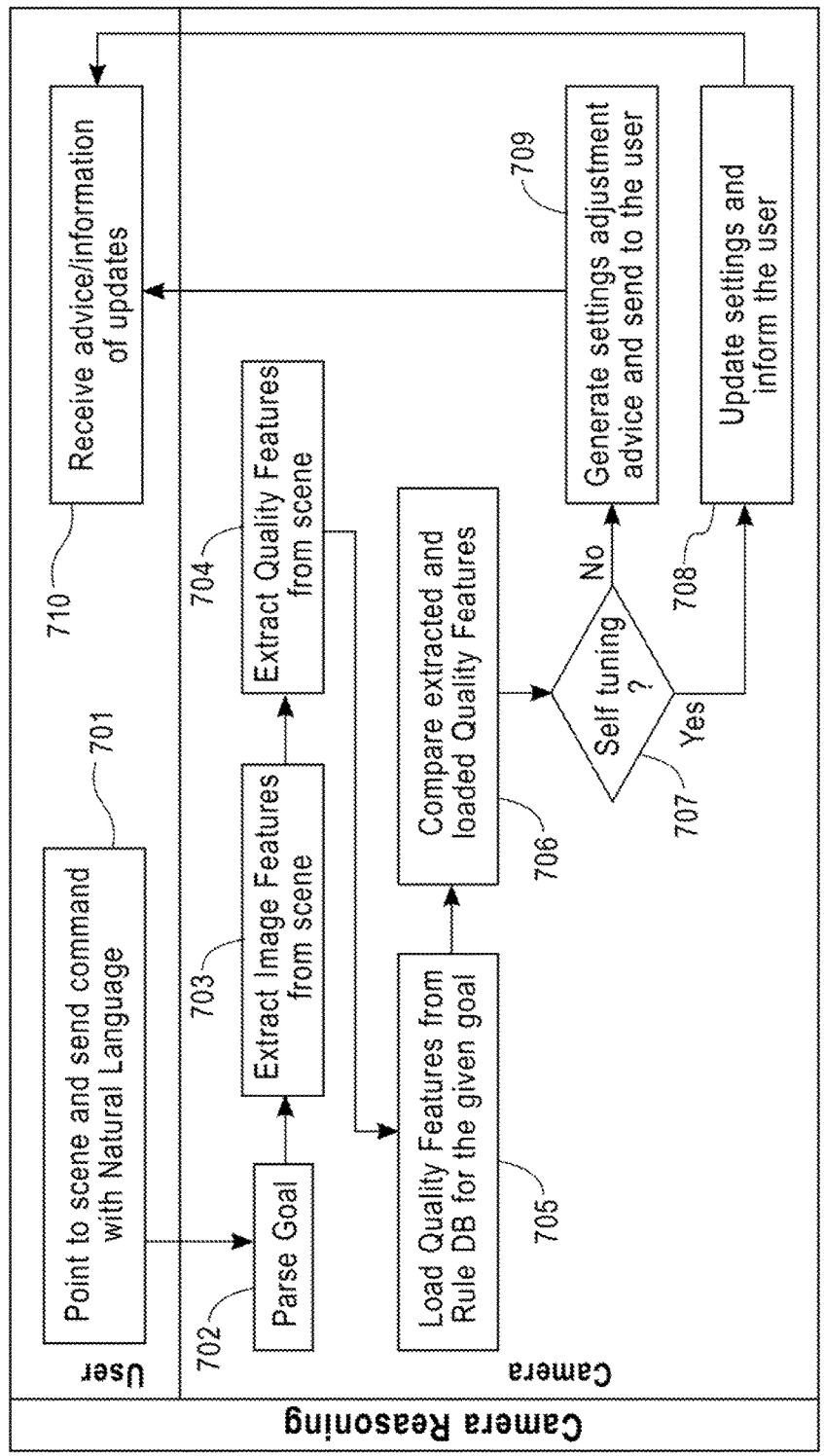
FIG. 7 is a flowchart illustrating a camera tuning advisor system and method according to an exemplary embodiment of the present invention.

FIG. 7 is a flowchart illustrating a camera tuning advisor system and method according to an exemplary embodiment of the present invention.

Referring to FIG. 7, a camera tuning advisor system and method according to an exemplary embodiment of the present invention may include a user pointing a camera at a scene and sending a command with natural language at operation 701. The natural language command may include one or more goals, which as discussed herein, may refer to an image or photograph having a desired characteristic being captured. For example, a user may provide a natural language command stating "please focus on Graham and leave the background de-focused" or "please focus and Graham and leave the background fuzzy." In this case, a first goal may be to focus on someone named Graham, and a second goal may be to defocus on a background area in the field of the cameras viewfinder. The camera may parse the goal(s) at operation 702, may extract image features from a scene at operation 703, and may extract quality features from the scene at operation 704. The camera may load setting features (e.g., quality features) from a rule database for the given goal at operation 705. The extracted and loaded quality features may be compared at operation 706. The camera may determine whether a self-tuning step should be performed at operation 707. If it is determined that a self-tuning step should be performed, the camera may update its settings and inform the user at operation 708. That is, the camera may automatically adjust its settings. If the camera determines that a self-tuning step should not be performed, the camera may generate settings adjustment advice and send the advice to the user at operation 709. The user may then receive either advice on how to update the settings or information regarding the self-tuned updated settings at operation 710.

According to an exemplary embodiment of the present invention, the natural language commands may include tokenization (which means splitting the sentences into tokens and a token may be a word or a punctuation like comma), lemmatization (which means detects the stems of the words), part-of-speech tagging (which means detecting the part of speech of each token) or named-entity recognition (which means identifying the class of the entities mentioned in the token). These NLP tasks can be achieved using a rule-based algorithm or supervised or unsupervised machine learning algorithms.

According to an exemplary embodiment of the present invention, extracting quality features from the scene at operation 704 and/or comparison of the quality features at operation 706 may include performing an image recognition procedure. For example, the SIFT algorithm, the SURF algorithm and deep neural network based algorithms may be employed. For quality feature classification, established methods known to those skilled in the art may be used for obtaining the desired metrics. For example, for overall brightness a histogram may be used. For sharpness, a method may be used employing the fast Fourier transform (FFT) or the variance of pixel values of a region of interest within the image or the full image to determine brightness.

According to an exemplary embodiment of the present invention, generating settings adjustment advice and sending the advice to the user at operation 709 may employ one or more planning algorithms. When the goal and the means employed by the camera to achieve the goal are formalized, the planning algorithm can compute the sequence of steps to achieve the goal or recognize that the stated goal cannot be achieved.

According to an exemplary embodiment of the present invention, parsing the user's goal(s) at operation 702 may include the camera automatically identifying what the user is trying to do without receiving or without understanding a user's stated natural language command. For example, the camera may automatically detect that a user is attempting to focus on a particular object (e.g., a tree) based on the user attempting to focus on such an object, even if an associated natural language goal (e.g., "focus on the tree only") is not understood. Thus, a goal may be parsed even when a natural language command is either not understood or is only partially understood by the camera.

Figure 8:
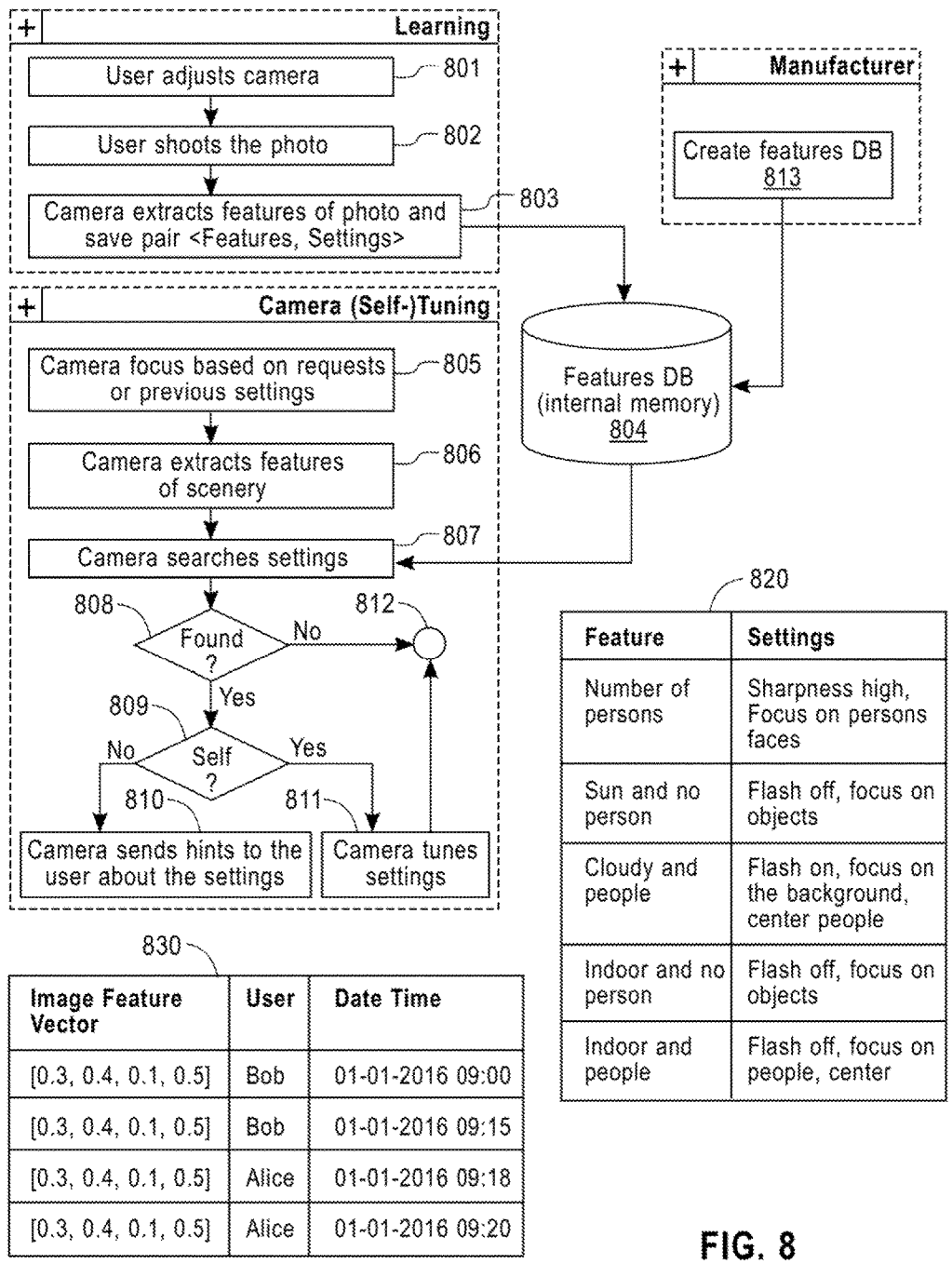
FIG. 8 illustrates a system and method for adaptive camera self-learning according to an exemplary embodiment of the present invention.

FIG. 8 illustrates a system and method for adaptive camera self-learning according to an exemplary embodiment of the present invention.

Referring to FIG. 8, a system and method for adaptive camera self-learning according to an exemplary embodiment of the present invention may include a camera learning module and a camera self-tuning module which may access features for adjusting camera settings based on photographs and features from photographs captured by a user in the past.

According to an exemplary embodiment of the present invention, the learning module may learn a user's preferred camera settings for different picture taking contexts. To implement camera self-learning, a user may adjust camera settings at operation 801. The setting may be adjusted manually, through natural language commands, and/or based on recommendations from the camera tuning advisor, as described herein. The user may then shoot the photo at operation 802. The camera may extract one or more features of the photo and save features and settings associated with the photo at operation 803. The photos including associated features and settings may be stored in a features database

804 (e.g., in the camera's internal memory). The features database 804 may access or may include camera features set by one or more camera manufacturers, which may be used to adjust the camera's settings, as desired. The user may manually identify photographs which have been successfully captured and achieve one or more of the user's goals. For example, a user may identify one or more photographs focusing on a person of interest while leaving the background de-focused. For example, the user may identify photographs that are considered to have appropriate temperature settings so that in the future the camera can refer to such an image in determining a user's desired temperature settings. Thus, the camera may learn the user's preferred settings in different contexts and with regard to different image capture goals by the user identifying which images include the desired features, impact or other characteristics.

According to an exemplary embodiment of the present invention, camera learning can be accomplished by using a hand-crafted or learning feature extraction mechanism. The hand-crafted feature extraction mechanism may be performed prior to the camera usage, while the learning feature extraction mechanism may be used during camera usage and may be automatic. In this case, convolutional neural networks (aka deep learning) may be used.

According to an exemplary embodiment of the present invention, the camera self-tuning module may perform the following steps. The camera may be focused based on a user's request (e.g., a natural language request) or previous settings at operation 805. That is, the camera may be initially manually adjusted, or may be adjusted according to natural language commands and/or suggestions received from the camera tuning advisor described herein. The camera may extract features from the scenery at operation 806 (e.g., the scenery in the camera's viewfinder). The camera may then search for settings at operation 807 that can best be applied to achieve one or more of the user's goals. That is, the camera may access one or more learned features, and may use the accessed learned features to adjust the camera's settings.

According to exemplary embodiments of the present invention, camera self-tuning may be performed automatically by the camera and/or may include the camera providing setting adjustment advice to the user via the camera tuning advisor described herein. The camera may determine whether desired settings (e.g., learned settings) are found. If desired settings are not found, the camera may maintain the current settings and the camera tuning may end at operation 812. If desired settings are identified, the camera may determine whether the camera will self-tune at operation 809. If the camera determines to self-tune then the camera tunes its settings at operation 811 and the tuning process may end at operation 812. If the camera determines not to self-tune, it may send hints to the user about the settings at operation 810. That is, the camera tuning advisor, as described herein, may provide additional advice regarding improved camera settings to the user. Thus, the learning module may provide camera settings which may be used to further improve the camera's settings to come in line with a user's identified preferred camera settings to achieve one or more desired image capture goals.

According to an exemplary embodiment of the present invention the features database 804 may be stored in and accessed from the cloud (e.g., through an Internet connection) or may be stored in the camera's internal memory.

According to an exemplary embodiment of the present invention, the features database 804 may tabulate and store one or more tables (e.g., table 820), which include camera settings associated with one or more features. For example, features may include settings associated with a number of persons in a scene, scenes with sun and no persons, cloudy scenes with people, indoors scenes with no persons, and indoor scenes with people. Thus, features may be associated with one or more picture taking contexts. The tables (e.g., table 820) may represent a user's identified camera settings when a particular image is captured (e.g., an image with cool temperatures in an indoor setting with people vs. an image with warm temperatures in an indoor setting with people). That is, a user may identify ideal or near ideal pictures which have been previously captured using particular camera settings, and the settings associated with the ideal or near ideal pictures may be tabulated and stored in the features database 804. Thus, the ideal or near ideal settings for different contexts or to achieve different goals may be learned, and the associated settings accessed for camera self-tuning (either automated or via recommended settings from the camera tuning advisor).

According to an exemplary embodiment of the present invention, the features database 804 may include a classifier, which may be trained to learn a user's ideal or near ideal settings to achieve different image capture goals in different contexts. The classifier may be trained using, for example, a features table (e.g., table 820).

According to an exemplary embodiment of the present invention, camera self-learning may be used to store settings for more than one user of a particular camera. For example, as illustrated in table 830, features such as sharpness, lightness, focus, motion blur, temperature and contrast may be mapped to a numeric vector, and different numeric vectors may be associated with one or more users. A camera may identify a particular user is currently using a camera and use an image feature vector table (e.g., table 830) to apply a particular set of features to a camera that are specific to that user. For example, a first user Bob may prefer cooler temperature pictures in all contexts, while a second user Alice may prefer warmer temperature pictures in all contexts. Thus, the camera learning module may be employed to learn the particular settings of more than one user of a same camera.

Figure 9:
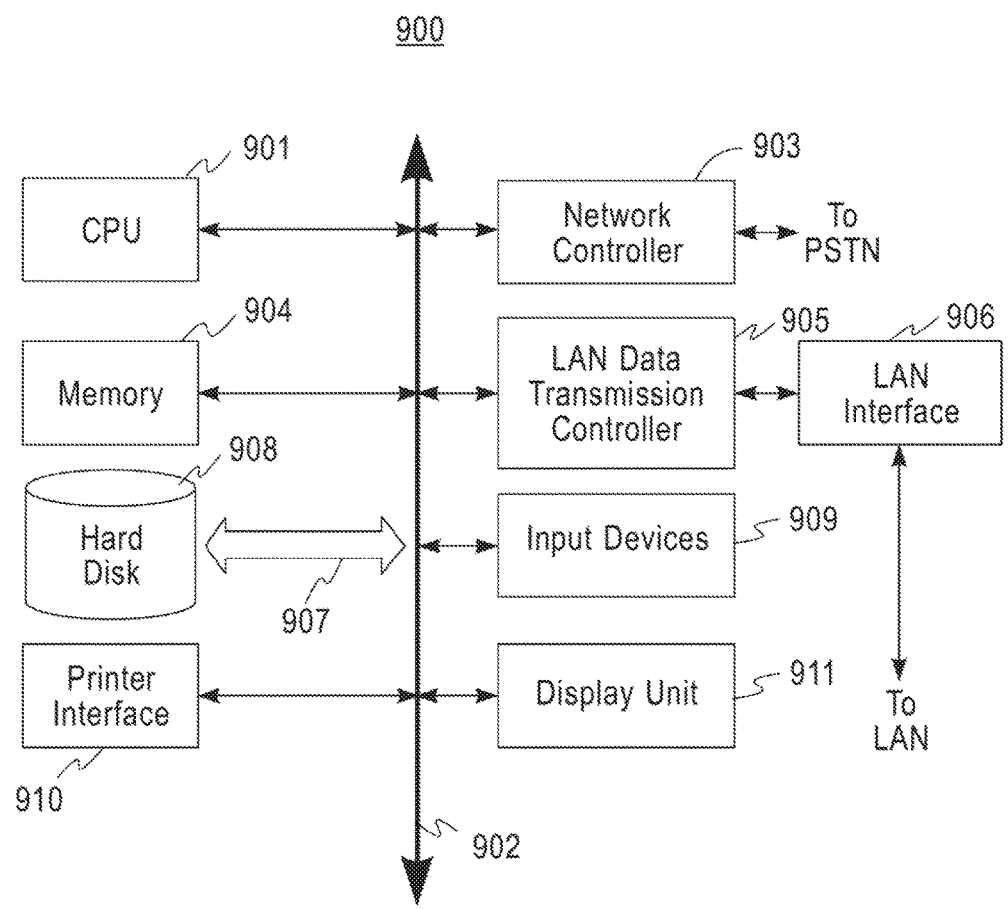
FIG. 9 illustrates an example of a computer system capable of implementing the methods according to exemplary embodiments of the present invention.

FIG. 9 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 900 may include, for example, a central processing unit (CPU) 901, random access memory (RAM) 904, a printer interface 910, a display unit 911, a local area network (LAN) data transmission controller 905, a LAN interface 906, a network controller 903, an internal bus 902, and one or more input devices 909, for example, a keyboard, mouse etc. As shown, the system 900 may be connected to a data storage device, for example, a hard disk, 908 via a link 907.

Exemplary embodiments of the present invention provide a computer program product for capturing image data, the computer program product including a computer readable storage medium having program instructions embodied therewith, the program instructions executable by a processor (e.g., CPU 901) to cause the processor (e.g., CPU 901)

to perform the following. Receive a voice command from a user. The voice command is received by a microphone of an image capture device. Identify a target subject and an image capture function included in the voice command using natural language processing (NLP). Search a first database for the target subject. The first database is stored on a memory disposed in the image capture device. Search a second database for the target subject when the target subject is not found in the first database. The second database is located remote from the image capture device and is accessed via an Internet connection established using a network interface of the image capture device. Extract a visual representation of the target subject from the first database or the second database upon finding the target subject in the first database or the second database. Detect the target subject in an environment viewed through a camera lens of the image capture device by comparing the visual representation of the target subject with objects appearing in the environment. Apply the image capture function to the target subject detected in the environment. Capture the image data. The image data includes the target subject, and the image capture function has been applied to the target subject in the captured image data.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. An image capture device, comprising:
   a camera lens configured to capture image data;
   a microphone configured to receive a voice command from a user;
   a network interface configured to establish a network connection;
   a memory storing a computer program and user preference data; and
   a processor configured to execute the computer program, wherein the computer program is configured to:
   identify a target subject and an image capture function based on the voice command and the user preference data;
   search a first database for the target subject, wherein the first database is stored on the memory;
   search a second database for the target subject when the target subject is not found in the first database, wherein the second database is located remote from the image capture device and is accessed via the network connection;
   extract a visual representation of the target subject from the first database or the second database upon finding the target subject in the first database or the second database;
   detect the target subject in an environment viewed through camera lens by comparing the visual representation of the target subject with objects appearing in the environment;
   apply the image capture function to the target subject detected in the environment;
   determine if image data is captured by the user; and
   update the user preference data to store the image capture function applied to the target subject detected in the environment based on whether the image data is captured or not,
   wherein the image capture function applied to the target object is stored in the memory when image date is captured, and
   wherein a decision not to capture image data is stored in the memory when image data is not captured.

2. The image capture device of claim 1, wherein the target subject is an object, person or animal, and wherein the object, person or animal is identified in the voice command from the user using natural language processing (NLP).

3. The image capture device of claim 2, further comprising:
   an input interface configured to receive input from the user,
   wherein the computer program is configured to log in to a social media network using credentials provided by the user through the input interface,
   wherein the second database is the social media network.

4. The image capture device of claim 3, wherein searching the second database for the target subject comprises searching a contact list of the social media network for the person's name to identify the visual representation of the target subject.

5. The image capture device of claim 3, wherein searching the second database for the target subject comprises:
   identifying faces from among the objects appearing in the environment; and
   comparing the identified faces from the environment with faces in a contact list of the social media network to identify the visual representation of the target subject.

6. The image capture device of claim 1, wherein the target subject is one of the objects appearing in the environment.

7. The image capture device of claim 6, wherein the second database is a public image database accessible via the network connection.

8. The image capture device of claim 7, wherein searching the second database for the target subject comprises searching the public image database using a name of the target subject to identify the visual representation of the target subject, wherein the name of the target subject is included in the voice command.

9. The image capture device of claim 7, wherein searching the second database for the target subject comprises comparing the objects appearing in the environment with objects stored in the public image database to identify the visual representation of the target subject.

10. A computer-implemented method of learning image capture device user preferences, comprising:
    receiving a voice command from a user, wherein the voice command is received by a microphone of an image capture device;
    identifying a target subject and an image capture function based on the voice command and user preference data;
    searching a first database for the target subject, wherein the first database is stored on a memory disposed in the image capture device;
    searching a second database for the target subject when the target subject is not found in the first database, wherein the second database is located remote from the image capture device and is accessed via a network connection established using a network interface of the image capture device;

extracting a visual representation of the target subject from the first database or the second database upon finding the target subject in the first database or the second database;

detecting the target subject in an environment viewed through a camera lens of the image capture device by comparing the visual representation of the target subject with objects appearing in the environment;

applying the image capture function to the target subject detected in the environment;

determining if image data is captured by the user; and updating the user preference data to store the image capture function applied to the target subject detected in the environment based on whether image data is captured, wherein the image capture function applied to the target object is stored in the memory when image date is captured, and wherein a decision not to capture image data is stored in the memory when image data is not captured.

11. The method of claim 10, wherein the target subject is an object, person or animal, and wherein the object, person or animal is identified in the voice command from the user using natural language processing (NLP).

12. The method of claim 11, further comprising:
logging in to a social media network, by the user, via a user interface of the image capture device,
wherein the second database is the social media network.

13. The method of claim 12, wherein searching the second database for the target subject comprises searching a contact list of the social media network for the person's or animal's name to identify the visual representation of the target subject.

14. The method of claim 12, wherein searching the second database for the target subject comprises:
identifying faces from among the objects appearing in the environment; and
comparing the identified faces from the environment with faces in a contact list of the social media network to identify the visual representation of the target subject.

15. The method of claim 10, wherein the target subject is one of the objects appearing in the environment.

16. The method of claim 15, wherein the second database is a public image database accessible via the network connection.

17. The method of claim 16, wherein searching the second database for the target subject comprises searching the public image database using a name of the target subject to identify the visual representation of the target subject, wherein the name of the target subject is included in the voice command.

18. The method of claim 16, wherein searching the second database for the target subject comprises comparing the objects appearing in the environment with objects stored in the public image database to identify the visual representation of the target subject.

19. The method of claim 10, wherein the image capture function comprises one of a sharpness modification function, a brightness modification function, a focus modification function, a motion blur modification function, a temperature modification function, and a contrast modification function.

20. A computer program product for learning image capture device user preferences, the computer program product comprising a non-transitory computer readable storage medium having program instructions embodied therewith, the program instructions executable by a processor to cause the processor to:
receive a voice command from a user, wherein the voice command is received by a microphone of an image capture device;
identify a target subject and an image capture function based on the voice command and user preference data;
search a first database for the target subject, wherein the first database is stored on a memory disposed in the image capture device;
search a second database for the target subject when the target subject is not found in the first database, wherein the second database is located remote from the image capture device and is accessed via a network connection established using a network interface of the image capture device;
extract a visual representation of the target subject from the first database or the second database upon finding the target subject in the first database or the second database;
detect the target subject in an environment viewed through a camera lens of the image capture device by comparing the visual representation of the target subject with objects appearing in the environment;
apply the image capture function to the target subject detected in the environment;
determine if image data is captured by the user, and
update the user preference data to store the image capture function applied to the target subject detected in the environment based on whether image data is captured,
wherein the image capture function applied to the target object is stored in the memory when image date is captured, and
wherein a decision not to capture image data is stored in the memory when image data is not captured.

* * * * *